US012762647B2

(12) United States Patent
Katagiri et al.

(10) Patent No.: US 12,762,647 B2
(45) Date of Patent: Oct. 13, 2026

(54) IMAGE ACQUISITION DEVICE

(71) Applicant: HAMAMATSU PHOTONICS K.K., Hamamatsu (JP)

(72) Inventors: Yoshiki Katagiri, Hamamatsu (JP); Munenori Takumi, Hamamatsu (JP); Keisuke Uchida, Hamamatsu (JP); Yuu Takiguchi, Hamamatsu (JP); Ken-ichi Kitayama, Hamamatsu (JP); Katsuhiro Ishii, Hamamatsu (JP); Tomonori Oishi, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 224 days.

(21) Appl. No.: 18/408,690

(22) Filed: Jan. 10, 2024

(65) Prior Publication Data

US 2024/0242308 A1 Jul. 18, 2024

(30) Foreign Application Priority Data

Jan. 13, 2023 (JP) ................................ 2023-003715

(51) Int. Cl.
*G06T 3/4053* (2024.01)
*G06T 12/00* (2026.01)
*G06V 10/25* (2022.01)

(52) U.S. Cl.
CPC ............ *G06T 3/4053* (2013.01); *G06T 12/00* (2026.01); *G06V 10/25* (2022.01)

(58) Field of Classification Search
CPC ...... G06T 3/4053; G06T 11/003; G06V 10/25
USPC .......................................................... 382/299
See application file for complete search history.

(56) References Cited

U.S. PATENT DOCUMENTS

2021/0019923 A1* 1/2021 Huang .................. H04N 23/55

FOREIGN PATENT DOCUMENTS

| | | | |
|---|---|---|---|
| JP | 7063378 | B2 | 5/2022 |
| WO | WO-2019/181969 | A1 | 9/2019 |
| WO | 2022/241374 | A1 | 11/2022 |

OTHER PUBLICATIONS

Saafin, W., et al., "Image super-resolution from compressed sensing observations," 2015 IEEE International Conference on Image Processing (ICIP), 2015, pp. 4268-4272.

* cited by examiner

*Primary Examiner* — Jonathan S Lee
(74) *Attorney, Agent, or Firm* — Faegre Drinker Biddle & Reath LLP

(57) ABSTRACT

An image acquisition device includes a mask member that includes a mask pixel that changes a transmittance of some parallel waves from a subject on a plane intersecting with an incident direction of the parallel wave, a detector that includes a plurality of pixels that is arranged in a direction intersecting with the incident direction of the parallel wave and detects the parallel wave that has passed through the mask member, and an image processing device that reconstructs an image using compressed sensing based on data regarding a relative moving amount between the mask member and the subject and detection signals of the plurality of pixels input from the detector, in which a size of the mask pixel of the mask member on the plane is smaller than a size of the plurality of pixels along the plane.

10 Claims, 11 Drawing Sheets

IMAGE ACQUISITION DEVICE

TECHNICAL FIELD

One aspect of the embodiment relates to an image acquisition device that acquires an image of a subject.

BACKGROUND

Typically, a method of acquiring a high-resolution image of a subject has been known. For example, in W. Saafin, M. Vega, R. Molinaand A. K. Katsaggelos, "Image super-resolution from compressed sensing observations", 2015 IEEE International Conference on Image Processing (ICIP), 2015, pp. 4268-4272, a method of acquiring a high-resolution image of a subject using an image reconstruction technology called compressed sensing is disclosed. According to this method, it is possible to reconstruct an image with a finer resolution than a pixel of an image sensor, based on output of the image sensor that images the subject.

SUMMARY

Technical Problem

The typical method described above has tendency that accuracy of a reconstructed image is insufficient in a case where a subject having a finer structure than pixels of an image sensor is targeted. Furthermore, since an information amount from the pixels of the image sensor is small, the accuracy of the reconstructed image tends to decrease.

Therefore, an object of one aspect of the embodiment is to provide an image acquisition device capable of accurately obtaining a high-resolution image of a subject.

Solution to Problem

An image acquisition device according to one aspect of the embodiment includes a mask member that has a pattern that changes a transmittance of some beams from a subject on an intersecting plane intersecting with an incident direction of the beam, a detector including a plurality of pixels that is arranged in a direction intersecting with the incident direction of the beam and detects a beam that has passed through the mask member, and a processor that reconstructs an image using compressed sensing based on data regarding a relative moving amount between the mask member and the subject and detection signals of the plurality of pixels input from the detector, in which a size of the pattern of the mask member on the intersecting plane is smaller than a size of the plurality of pixels along the intersecting plane.

According to the one aspect, the size of the pattern of the mask member on the intersecting plane intersecting with the incident direction of the beam is set to be smaller than the size along the intersecting plane of the pixel of the detector. Then, in the processor, an image is reconstructed through compressed sensing, based on the detection signals of the plurality of pixels arranged in the direction intersecting with the incident direction and the data regarding the relative moving amount between the mask member and the subject. As a result, the information amount from the plurality of pixels can be increased, by using the detection signal detected after a transmittance in a space is finely changed. As a result, it is possible to accurately obtain a high-resolution image of the subject.

Advantageous Effects of Invention

According to the present disclosure, it is possible to accurately obtain a high-resolution image of a subject.

DETAILED DESCRIPTION

Figure 1:
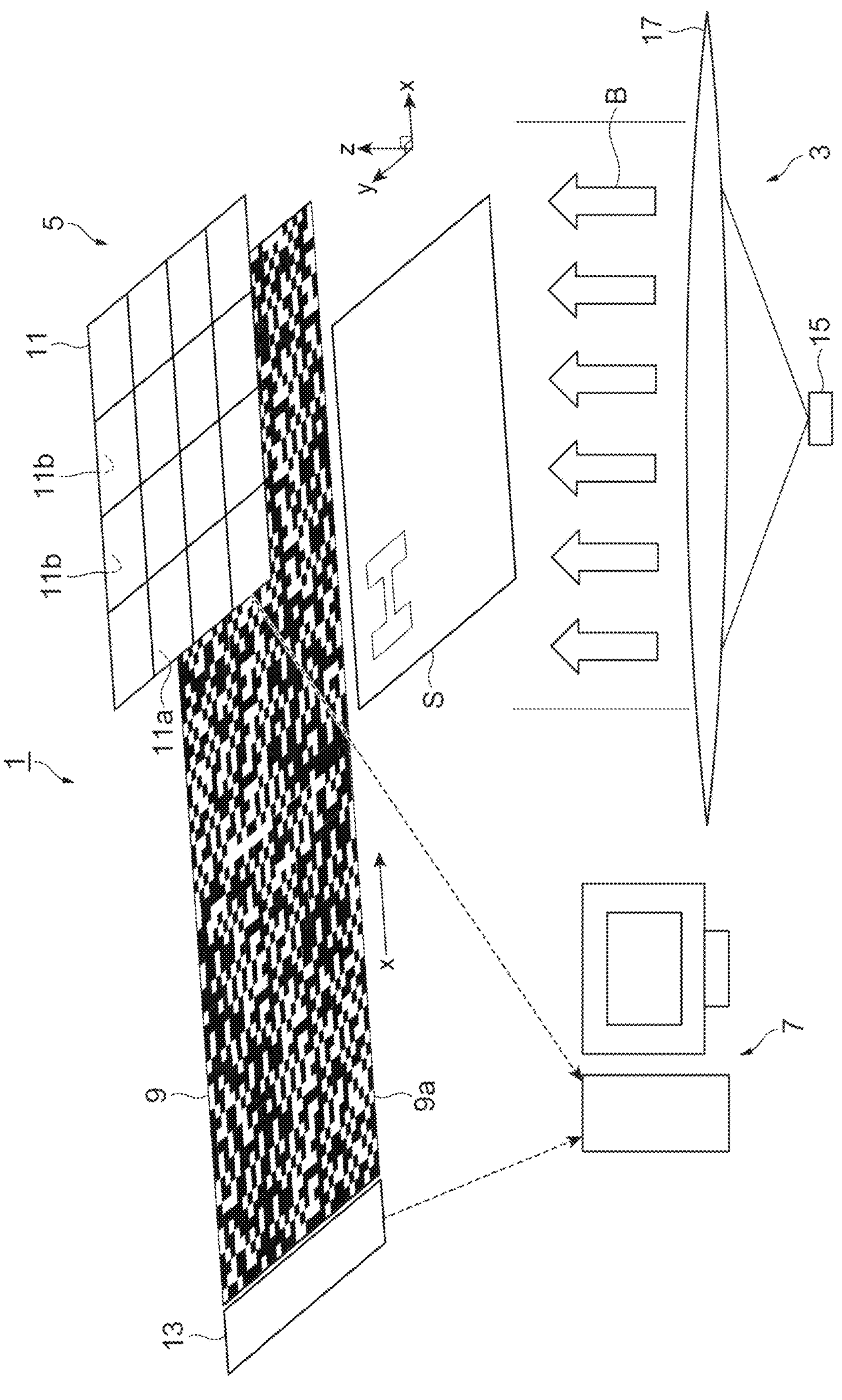
FIG. 1 is a diagram illustrating a configuration of an image acquisition device according to a first embodiment.

Hereinafter, embodiments of the present invention will be described in detail with reference to the accompanying drawings. Note that, in the description, the same reference numeral is used for the same component or a component having the same function, and redundant description is omitted.

First Embodiment

FIG. 1 is a diagram illustrating a configuration of an image acquisition device according to a first embodiment; In FIG. 1, components a detection optical system of a subject are illustrated as a perspective view, and other components are illustrated as a block diagram. Directions along an installation surface of the detection optical system are set as an x-axis direction and a y-axis direction, and a direction orthogonal to the x-axis direction and the y-axis direction that is an incident direction of an electromagnetic wave (beam) toward a subject S is set as a z-axis direction. The image acquisition device 1 is a device that acquires a high-resolution image of the subject S. The image acquisition device 1 includes an illumination optical system 3, a detection optical system 5, and an image processing device (processor) 7.

The detection optical system 5 includes a mask member 9, a detector 11, and a moving mechanism (conveying unit) 13. The mask member 9 is an optical member having a substantially rectangular shape that is arranged to be separated from the subject S in the z-axis direction and to face to the subject S and extends in the x-axis direction along an xy plane (intersecting plane intersecting with incident direction of electromagnetic wave). The mask member 9 has a structure that spatially modulates the electromagnetic wave that has been emitted from the detection optical system 5 and has passed through the subject S on the xy plane and transmits the electromagnetic wave. In the present embodiment, the mask member 9 has a plurality of mask pixels (pattern) 9*a* that is formed by two-dimensionally dividing the mask member 9 in the x-axis direction and the y-axis direction and has a square region with the same size. The size of the plurality of mask pixels 9*a* is larger than a wavelength of the electromagnetic wave that passes through the subject S. A transmittance of light of the plurality of mask pixels 9*a* is set to one of two values (specifically, 0% or 100%), and the plurality of mask pixels 9*a* is formed so that arrangement patterns of the two types of mask pixels 9*a* having different transmittances are irregular. Although the number of mask pixels 9*a* is not limited to a specific number, the number is, for example, 2,592 in total including the number of mask pixels 9*a* arranged in the x-axis direction: 81 and the number of mask pixels 9*a* arranged in the y-axis direction: 32.

The moving mechanism 13 includes a driving unit such as a stepping motor, a servo motor, or a geared motor therein, and has a function of linearly moving the mask member 9 in the x-axis direction. The moving mechanism 13 repeatedly moves the mask member 9 along an arrangement direction of the plurality of mask pixels 9*a* by a preset distance (for example, size of mask pixel 9*a* in x-axis direction). Furthermore, the moving mechanism 13 outputs data regarding a moving amount of the mask member 9 along the x-axis direction, to an image processing device 7.

The detector 11 is an element that is arranged to be separated from the mask member 9 in the z-axis direction and to face to the subject S and the mask member 9 and detects an intensity distribution of the electromagnetic wave that has been emitted from the detection optical system 5 and has passed through the subject S and the mask member 9. The detector 11 includes a rectangular light receiving surface 11*a* along the xy plane on the subject S side, and a plurality of pixels 11*b* that is two-dimensionally divided and arranged in the x-axis direction and the y-axis direction (direction intersecting with incident direction of electromagnetic wave) on the light receiving surface 11*a* and is a square region having the same size. Although the number of pixels 11*b* on the light receiving surface 11*a* is not limited to a specific number, the number is, for example, 16 in total including the number of pixels 11*b* arranged in the x-axis direction: 4 and the number of pixels 11*b* arranged in the y-axis direction: 4. Here, the size of the pixel 11*b* along the x-axis direction and the size of the pixel 11*b* along the y-axis direction are respectively larger than the size of the mask pixel 9*a* along the x-axis direction and the size of the mask pixel 9*a* along the y-axis direction, and for example, the size of the pixel 11*b* along the x-axis direction and the size of the pixel 11*b* along the y-axis direction are respectively eight times the size of the mask pixel 9*a* along the x-axis direction and the size of the mask pixel 9*a* along the y-axis direction.

The illumination optical system 3 includes a light source device (light source) 15 and a lens 17. The light source device 15 irradiates the subject S with the electromagnetic wave in the z-axis direction. The light source device 15 emits visible light, terahertz waves, infrared light, ultraviolet light, X rays, or gamma rays, as the electromagnetic wave. As the light source device 15 according to the present embodiment, a device that emits visible light is used as an example. The lens 17 converts the electromagnetic wave emitted from the light source device 15 into a parallel wave B that propagates in parallel to the z-axis direction so as to cause the electromagnetic wave enter the subject S.

The image processing device 7 is an arithmetic device that generates a high-resolution image of the subject S. The image processing device 7 is physically a computer or the like that includes a central processing unit (CPU) which is a processor, a random access memory (RAM) or a read only memory (ROM) which is a recording medium, a communication module, an input/output module, or the like. Note that the image processing device 7 may include a display, a keyboard, a mouse, a touch panel display, or the like as an input/output device or may include a data recording device such as a hard disk drive or a semiconductor memory. Furthermore, the image processing device 7 may include a plurality of computers. The image processing device 7 is configured to be able to receive data using wired communication or wireless communication from the detector 11 and the moving mechanism 13. Hereinafter, functions of the image processing device 7 will be described in detail.

The image processing device 7 receives input of detection signals O of the plurality of pixels 11*b* from the detector 11, at each timing when the mask member 9 is repeatedly moved by the moving mechanism 13 about K times (K is arbitrary integer), from the detector 11 and acquires data regarding a relative moving amount between the mask member 9 and the subject S at the times of first to K-th measurements. The data regarding the relative moving amount may be set in the image processing device 7 in advance or may be input from the moving mechanism 13. The image processing device 7 generates a reconstructed image that is a high-resolution image by reconstructing an image using compressed sensing, using the detection signals $O_1$ to $O_K$ from the first time to the K-th time and the data regarding the relative moving amount from the first time to the K-th time.

Figure 2:
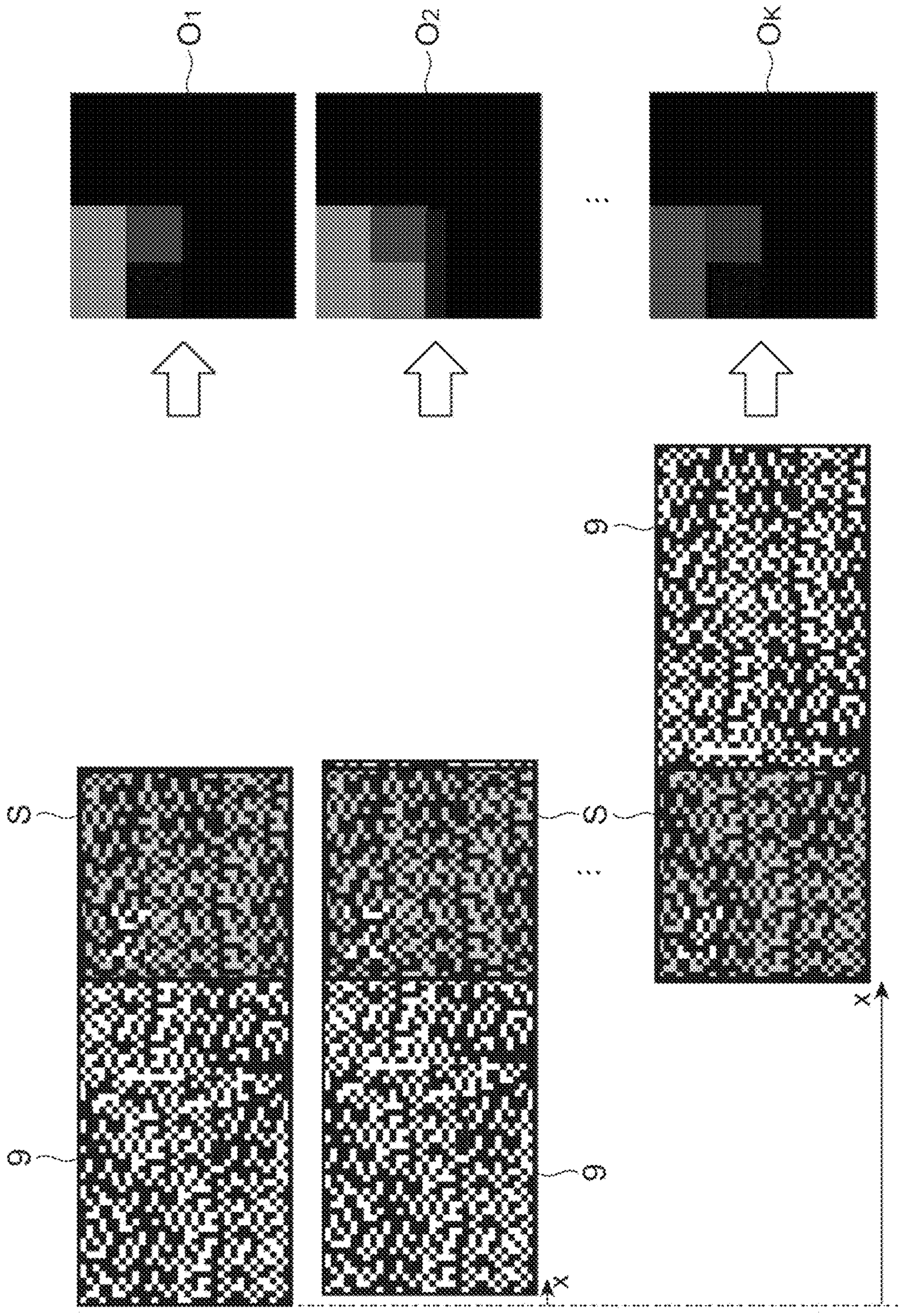
FIG. 2 is a diagram illustrating an image of a detection signal acquired in correspondence with a movement state of a mask member with respect to a subject.

FIG. 2 is a diagram illustrating an image of a detection signal acquired in correspondence with a movement state of a mask member with respect to a subject; In this way, the detection signals $O_1$, $O_2$, . . . , and $O_K$ of the plurality of pixels 11*b* in a case where the moving amount of the mask member 9 with respect to the subject S along the x-axis direction changes at a predetermined interval are acquired.

Here, a function of the image processing device 7 in a case where the number of pixels of the detector 11 is set to be M: x-axis direction and N: y-axis direction (M and N are positive integers) and a reconstructed image including $S=P\times M$ pixels: x-axis direction and $T=Q\times N$ pixels: y-axis direction (P and Q are positive integers) is generated will be described. In this case, the reconstructed image is an image obtained by subdividing each pixel 11*b* of the detector 11 by P regions in the x-axis direction and Q regions in the y-axis direction. In the following description, a region obtained by dividing the plurality of pixels 11*b* is indicated by (m, n; p, q). This expression indicates a region in a p-th column and a q-th row in a square region obtained by dividing an m-th (also referred to as m-th column) pixel in the x-axis direction that is an n-th (also referred to as n-th row) pixel in the y-axis direction. Although the image processing device 7 has a function of generating a reconstructed image on the premise that the detector 11 detects the parallel wave, the image processing device 7 can similarly generate a reconstructed image by considering a magnification ratio estimated from a distance between components in a case where the illumination optical system 3 emits spherical waves.

Figure 3:
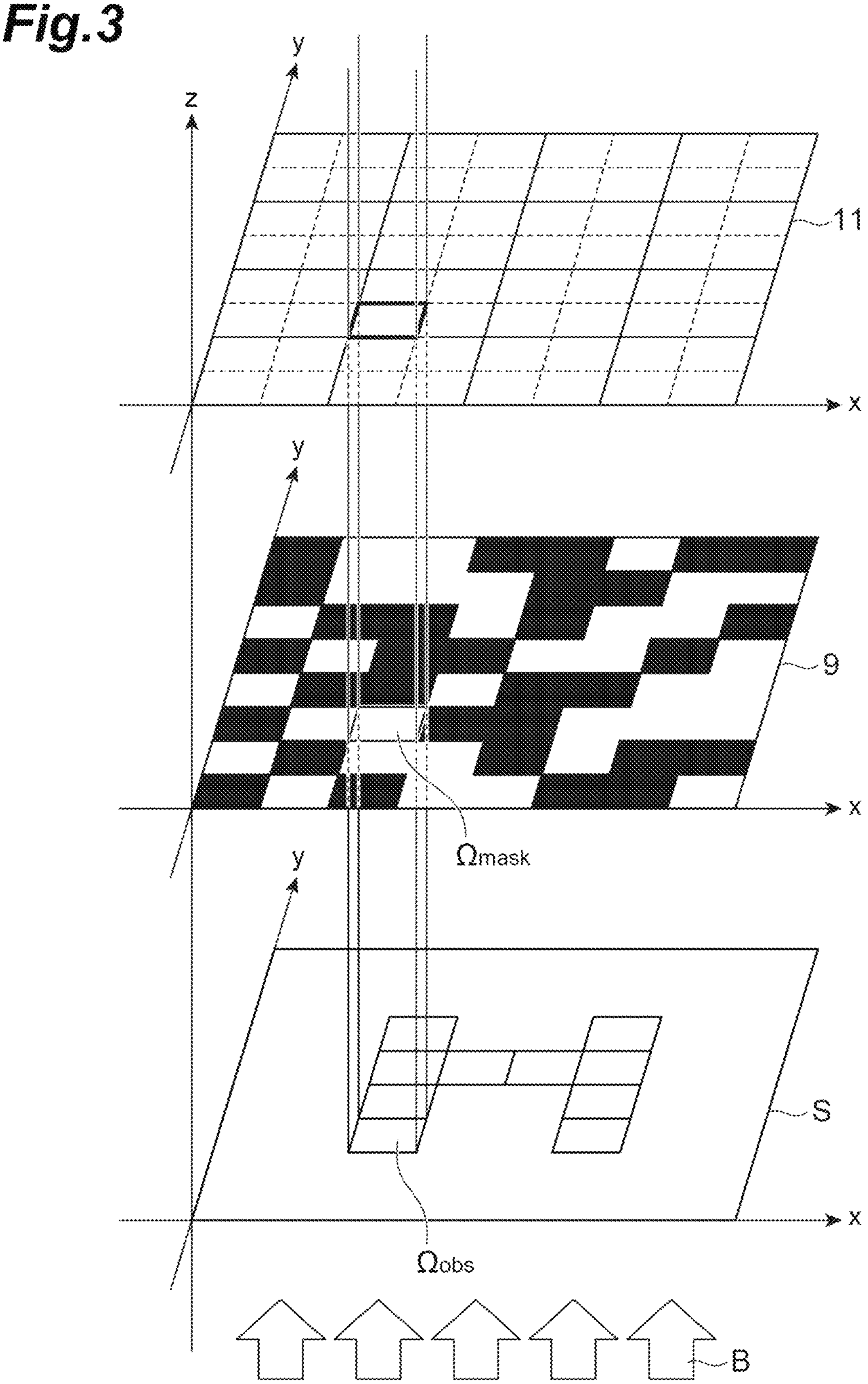
FIG. 3 is a diagram illustrating a relative positional relationship between the subject, the mask member, and a detector at the time of first measurement.

In FIG. 3, a relative positional relationship between the subject S, the mask member 9, and the detector 11 at the time of first measurement is illustrated. In a region of the detector 11 (m, n: p, q), light that has passed through a region $\Omega_{obs}$ (m, n: p, q) on the subject S and a region $\Omega_{mask}$ (m, n: p, q) on the mask member 9 enters. A distribution T (x, y) of a transmittance of the mask member 9 on the xy plane at the first measurement is known, and from this distribution, a transmittance $T_1$ (m, n: p, q) in the region (m, n: p, q) on the mask member 9 is expressed by the following formula (1);

$$T_1(m, n; p, q) = \frac{1}{|\Omega_{mask}|}\int\int_{\Omega_{mask}} dxdy\, T(x, y). \tag{1}$$

Here, $\Omega_{mask}$ in the above formula means a region (plane) representing where in the mask member 9 the light entering the region (m, n: p, q) of the detector 11 passes through. The above formula (1) represents a value obtained by dividing a value of a surface integral of the distribution T (x, y) for all points (x, y) in $\Omega_{mask}$ by an area of $\Omega_{mask}$. In other words, $T_1$ (m, n; p, q) is an average value of a spatial transmittance of the region of the mask member that transmits the light entering the region (m, n: p, q) of the detector 11. Furthermore, a light intensity $I_{obs}$ (m, n: p, q) of light that passes through the region fobs (m, n: p, q) on the subject S is expressed by the following formula (2) using a light intensity distribution $I_{obs}$ (x, y) on the xy plane of light that passes through the subject S;

$$I_{obs}(m, n; p, q) = \frac{1}{|\Omega_{mask}|}\int\int_{\Omega_{mask}} dxdy I_{obs}(x, y). \tag{2}$$

Figure 4:
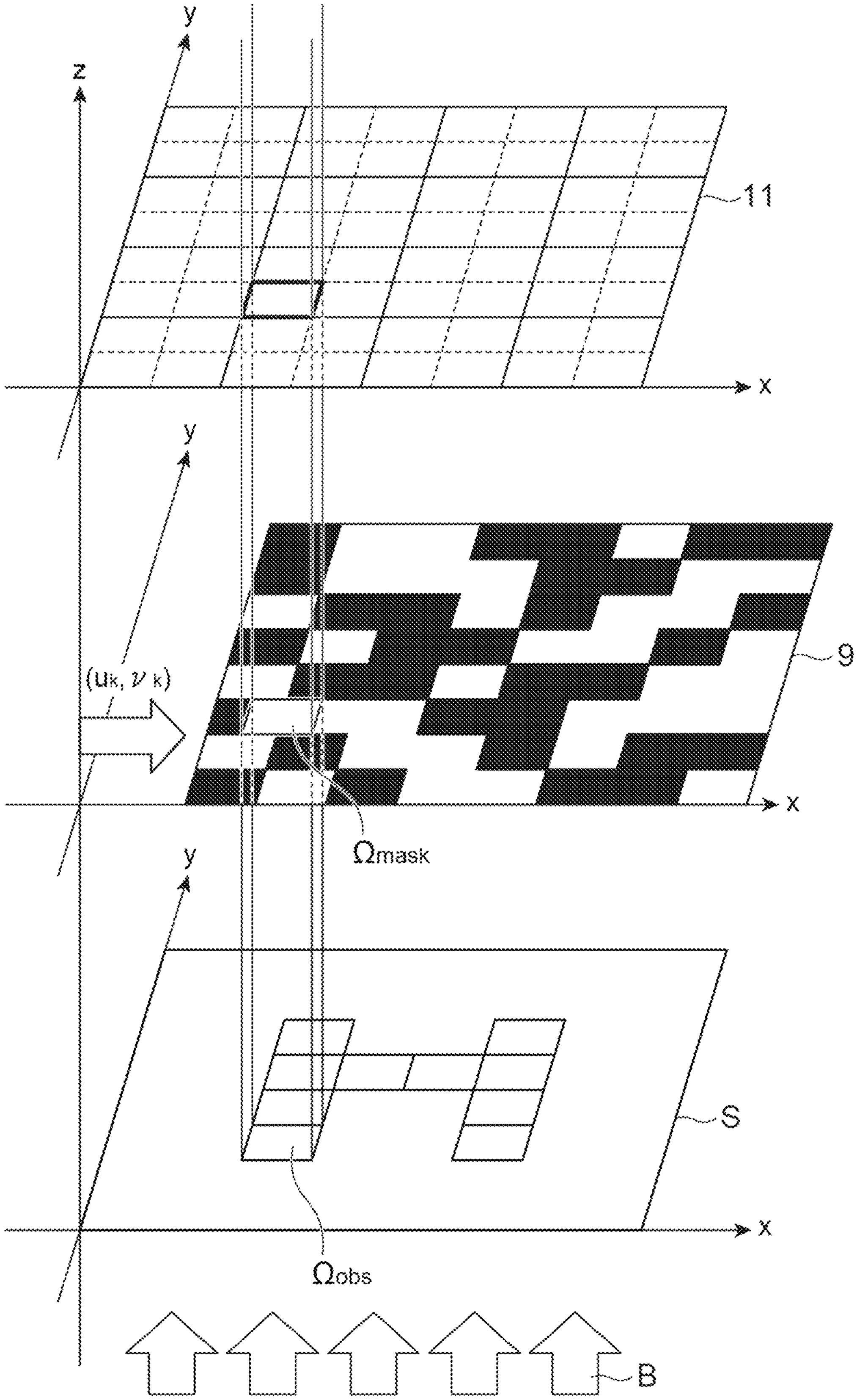
FIG. 4 is a diagram illustrating a relative positional relationship between the subject, the mask member, and the detector at the time of k-th measurement.

In FIG. 4, a relative positional relationship between the subject S, the mask member 9, and the detector 11 at the time of k-th measurement (k is integer equal to or more than two and equal to or less than K) is illustrated. Based on the data regarding the relative moving amount between the mask member 9 and the subject S, a moving amount $u_k$ of the mask member 9 in the x-axis direction and a moving amount $v_k$ in the y-axis direction at the time of the k-th measurement are specified. From this moving amount ($u_k$, $v_k$), a transmittance $T_k$ (m, n: p, q) in the region (m, n: p, q) of the mask member 9 at the time of the k-th measurement is expressed by the following formula (3);

$$T_k(m, n; p, q) = \frac{1}{|\Omega_{mask}|}\int\int_{\Omega_{mask}} dxdy\, T(x-u_k, y-v_k). \tag{3}$$

Furthermore, the light intensity $I_{obs}$ (m, n: p, q) of the light that passes through the region $\Omega_{obs}$ (m, n: p, q) on the subject S is expressed by the following formula (4) using the light intensity distribution $I_{obs}$ (x, y) on the xy plane of the light that passes through the subject S;

$$I_{obs}(m, n; p, q) = \frac{1}{|\Omega_{mask}|}\int\int_{\Omega_{mask}} dxdy I_{obs}(x, y). \tag{4}$$

The detection signal $O_k$ (m, n) of the pixel 11*b* in the m-th column and the n-th row of the detector 11 at the time of the k-th measurement is expressed by the following formula (5) as a sum of light intensities of light entering a divided region in the pixel;

$$O_k(m, n) = \sum_{\substack{p=1,2,\ldots,P \\ q=1,2,\ldots,Q}} T_k(m, n; p, q) \times I_{obs}(m, n; p, q). \tag{5}$$

When a one-dimensional vector in which the detection signals $O_k$ (m, n) obtained by K times of measurements are arranged is assumed as a measurement vector y and a one-dimensional vector in which the light intensities $I_{obs}$ (m, n: p, q) are arranged in order is assumed as a reconstructed image vector x, each element of the measurement vector y can be expressed as a linear sum of elements of the reconstructed image vector x from the above formula (5). Therefore, the measurement vector y can be expressed by the following formula (6) by using a transformation matrix D;

$$y = Dx. \tag{6}$$

By using the above theory, the image processing device 7 obtains the transformation matrix D necessary for calculation of image reconstruction, by referring to the transmittance distribution T (x, y) of the mask that is a known value and the data regarding the relative moving amount between the mask member 9 and the subject S at each measurement. That is, an arrangement of the measurement vector y is set so that an i-th element $y_i$ of the measurement vector y become $O_j$ (m, n) when i=(k−1) NM+(n−1) M+m. Furthermore, an arrangement of the reconstructed image vector x is set so that an i-th element $x_i$ of the reconstructed image vector x become $I_{obs}$ (m, n: p, q) when i={(n−1) Q+q−1} MP+(m−1) P+p. The image processing device 7 calculates an element $D_{i,j}$ in an i-th column and a j-th row of the transformation matrix D that is a two dimensional matrix including NMPQ columns and KNM rows, using values $n_i$, $m_i$, $p_i$, and $q_i$ that satisfy i={($n_i$−1) Q+$q_i$−1} MP+($m_i$−1) P+$p_i$ and values $k_j$, $n_j$, and $m_j$ that satisfy j=($k_j$−1) NM+($n_j$−1) M+$m_j$, according to the following formula (7);

$$D_{i,j} = \delta_{m_i,m_j}\delta_{n_i,n_j}T_{k_j}(m_i, n_i; p_i, q_i) = \delta_{m_i,m_j}\delta_{n_i,n_j}\frac{1}{|\Omega_{mask}(m_i, n_i; p_i, q_i)|}\int\int_{\Omega_{mask}(m_i,n_i;p_i,q_i)} dxdy\, T\left(x-u_{k_j}, y-v_{k_j}\right). \tag{7}$$

By repeating the above calculation, the image processing device 7 can obtain the transformation matrix D. $\delta_{n,m}$ is a function that is called Kronecker delta (each of n and m is natural number), satisfies $\delta_{n,m}$=1 in a case where n=m, and satisfies $\delta_{n,m}$=0 in a case where n≠m.

Moreover, the image processing device 7 calculates the reconstructed image vector x, using the calculated transformation matrix D and the measurement vector y. In general, in a case where the reconstructed image vector x can be described as a linear sum as indicated by the following formula (8);

$$x = \sum_i v_i a_i \tag{8}$$

using a basis $v_i$ and a coefficient $a_i$, a one-dimensional vector a in which coefficients $a_i$ are arranged is expressed by the following formula (9)

$$a = \Psi x, \tag{9}$$

using a matrix inverse Ψ which is a matrix in which the bases $v_i$ are arranged. Assuming that the reconstructed image vector x has sparsity regarding the basis $v_i$, the image processing device 7 calculates the reconstructed image vector x by solving a generalized $1^1$ regularization problem (generalized LASSO) below, assuming that most elements of the one-dimensional vector a are components of zero having no value and only a few elements have a value.

$$\underset{x}{\text{minimize}}\ \frac{1}{2}\|Dx - y\|^2 + \lambda\|\Psi x\|_1$$

Alternatively, the image processing device 7 may calculate the reconstructed image vector x, by solving the generalized $1^1$ optimization problem below.

$$\underset{x}{\text{minimize}}\ \|\Psi x\|_1 \text{ subject to } Dx = y$$

For example, the image processing device 7 can calculate the reconstructed image vector x, using an alternating direction method of multipliers (ADMM) that is one type of compressed sensing algorithm described in Japanese Patent No. 7063378.

The image processing device 7 converts the reconstructed image vector x reconstructed as described above into a two-dimensional reconstructed image. Then, the image processing device 7 outputs the two-dimensional reconstructed image to an output device such as a display or a touch panel display.

Workings and effects of the present embodiment will be described.

In the image acquisition device 1, the size of the mask pixel 9*a* of the mask member 9 on the xy plane intersecting with the incident direction of the parallel wave B is set to be smaller than the size of the pixel 11*b* of the detector 11 along the xy plane. Then, in the image processing device 7, a high-resolution image is reconstructed through compressed sensing, based on the detection signals O of the plurality of pixels 11*b* arranged in a direction intersecting with the incident direction and the data regarding the relative moving amount between the mask member 9 and the subject S. As a result, by using the detection signal O detected after the transmittance in the space is finely changed, an information amount from the plurality of pixels 11*b* can be increased. As a result, it is possible to accurately obtain the high-resolution image of the subject S.

Furthermore, the image processing device 7 reconstructs an image based on the plurality of the detection signals $O_1$ to $O_K$ of the plurality of pixels 11*b* obtained when the relative moving amount changes. In this case, the image can be reconstructed based on the plurality of detection signals $O_1$ to $O_K$ obtained while changing the pattern of the change in the transmittance in the space, and it is possible to further improve the high-resolution image of the subject S.

Furthermore, the image acquisition device 1 further includes the moving mechanism 13 that moves the mask member 9 with respect to the subject S and outputs the data regarding the moving amount to the image processing device 7. In this case, it is possible to accurately obtain the high-resolution image of the subject S with a compact device configuration.

Furthermore, the image acquisition device 1 further includes the light source device 15 that emits electromagnetic wave, and the size of the mask pixel 9*a* of the mask member 9 on the xy plane is set to be larger than the wavelength of the electromagnetic wave. With such a configuration, it is possible to accurately obtain the high-resolution image of the subject S using the detection signal O of the subject S obtained by irradiating the electromagnetic wave.

Furthermore, the detector 11 includes the plurality of pixels 11*b* that is two-dimensionally arranged. In this case, it is possible to efficiently obtain a high-resolution image with high accuracy in a wide range.

Second Embodiment

Figure 5:
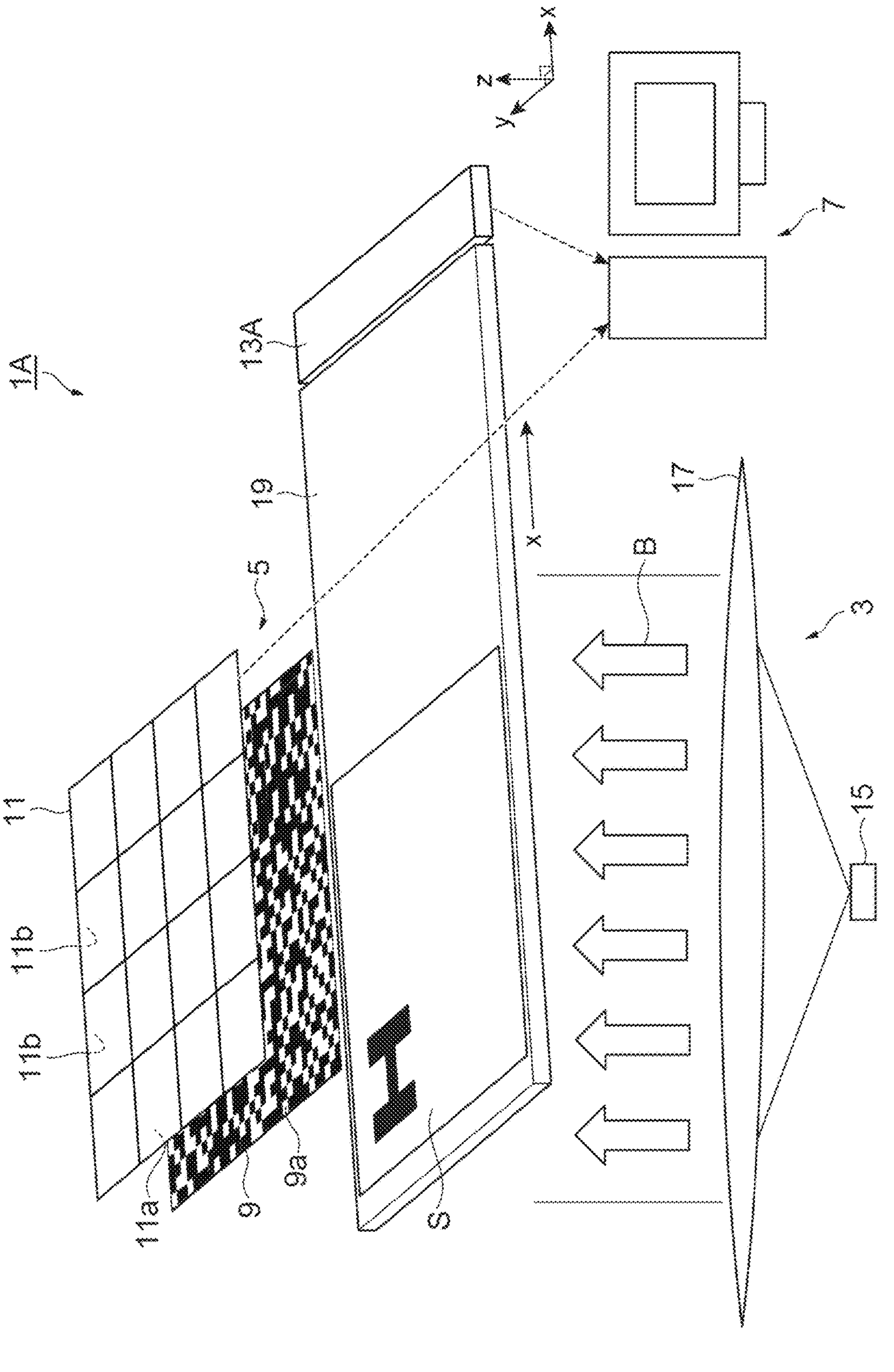
FIG. 5 is a diagram illustrating a configuration of an image acquisition device according to a second embodiment.

A second embodiment of the present invention will be described. FIG. 5 is a diagram illustrating a configuration of an image acquisition device according to a second embodiment; The image acquisition device 1A has a different configuration from the image acquisition device 1 according to the first embodiment in that the image acquisition device 1A includes a conveyance mechanism 13A instead of the moving mechanism 13 and the mask member 9 is fixed to face to the light receiving surface 11*a* of the detector 11. Hereinafter, parts of the configuration of the image acquisition device 1A different from those of the first embodiment will be described.

The conveyance mechanism 13A includes a driving unit such as a stepping motor and a belt portion 19 including an arrangement surface where a subject S is arranged, and has a function of linearly moving the subject S in an x-axis direction with respect to the mask member 9. The conveyance mechanism 13A repeatedly moves the subject S along an arrangement direction of a plurality of mask pixels 9*a*, in a preset distance.

Furthermore, the conveyance mechanism 13A outputs data regarding a moving amount of the subject S along the x-axis direction, to an image processing device 7.

The image processing device 7 receives input of a detection signal O from the detector 11 at each of timings when the subject S is repeatedly moved by the conveyance mechanism 13A about K times, from the detector 11 and acquires data regarding a relative moving amount between the mask member 9 and the subject S at the times of first to K-th measurements. The data regarding the relative moving amount may be set in the image processing device 7 in advance or may be input from the conveyance mechanism 13A.

Figure 6:
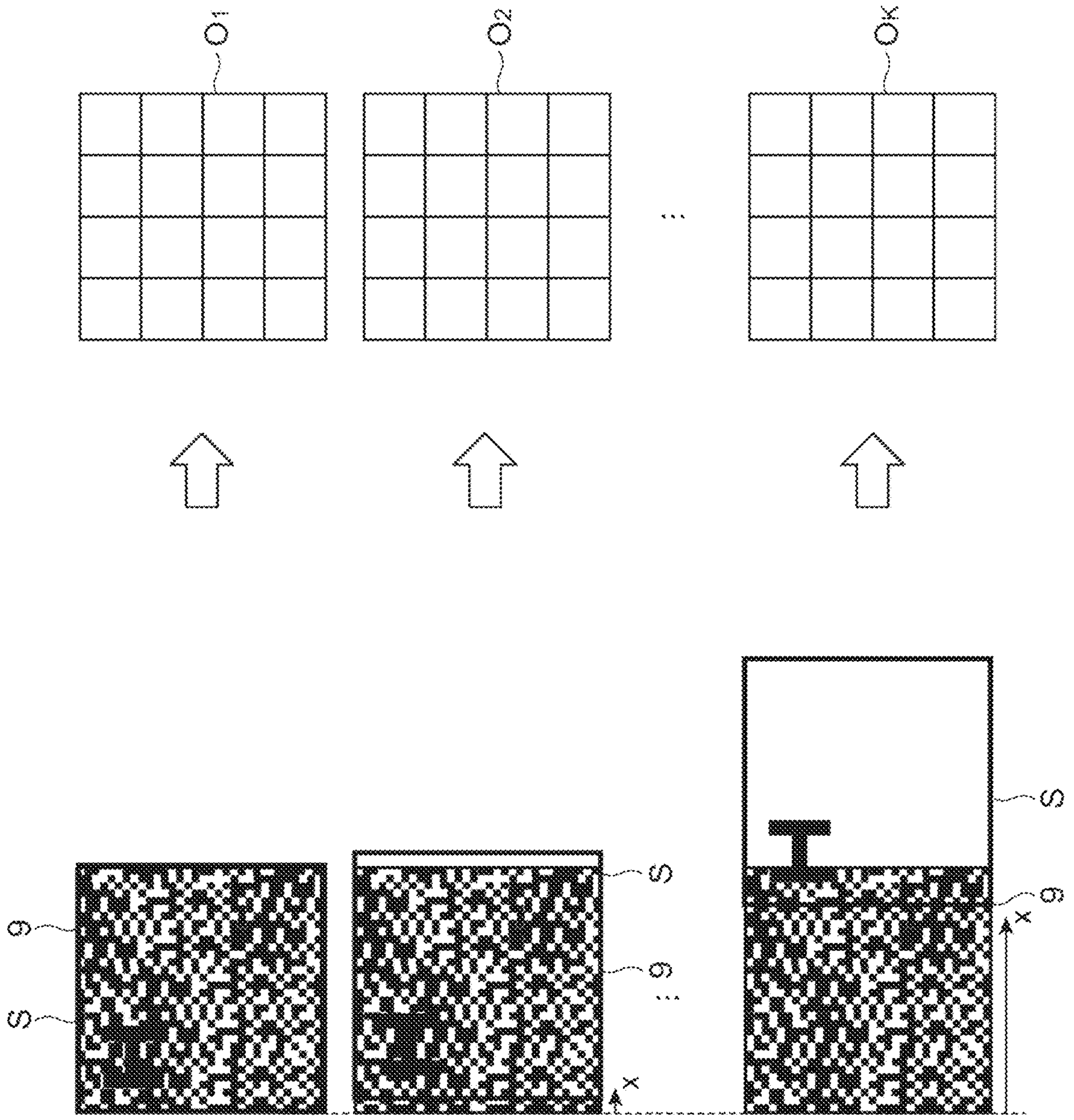
FIG. 6 is a diagram illustrating an image of the detection signal acquired in correspondence with a movement state of the subject with respect to the mask member.

FIG. 6 is a diagram illustrating an image of the detection signal acquired in correspondence with a movement state of the subject with respect to the mask member; In this way, the plurality of detection signals $O_1$, $O_2$, . . . , and $O_K$ of the plurality of pixels 11*b* in a case where the moving amount of the subject S with respect to the mask member 9 along the x-axis direction changes at a predetermined interval are acquired.

Figure 7:
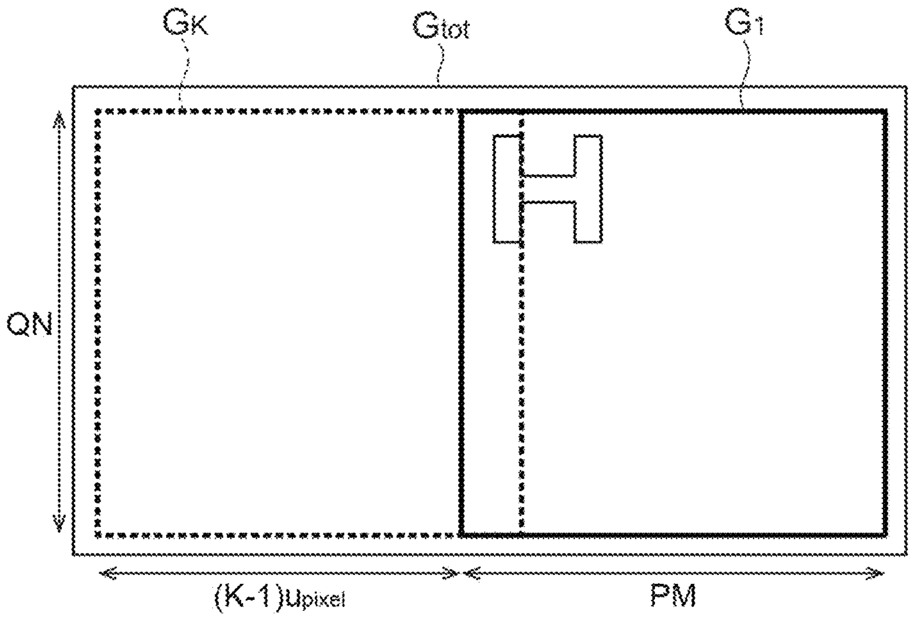
FIG. 7 is a diagram illustrating an image of a reconstructed image acquired by an image processing device in the second embodiment.

In FIG. 7, an image of a reconstructed image acquired by the image processing device 7 in the second embodiment is illustrated. The number of pixels of the reconstructed image acquired by the image processing device 7 changes depending on how to move the subject S. A case is considered where the detection signal O is acquired while moving the subject S in the x-axis direction only by a displacement amount u. At this time, an image region $G_{tot}$ overlapping in a case where image regions are shifted K times by a displacement amount $u_{pixel}$ in pixel units corresponding to the displacement amount u, from an image region $G_1$ with a PM×QN size corresponding to a first measurement region to an image region $G_K$ with a PM×QN size corresponding to the K-th measurement is an image region of the reconstructed image. Therefore, the number of pixels of the reconstructed image is $\{PM+(K-1)u_{pixel}\}\times QN$.

The image processing device 7 generates the reconstructed image as follows. Although the image processing device 7 has a function of generating a reconstructed image on the premise that the detector 11 detects the parallel wave, the image processing device 7 can similarly generate a reconstructed image by considering a magnification ratio estimated from a distance between components in a case where the illumination optical system 3 emits spherical waves.

Figure 8:
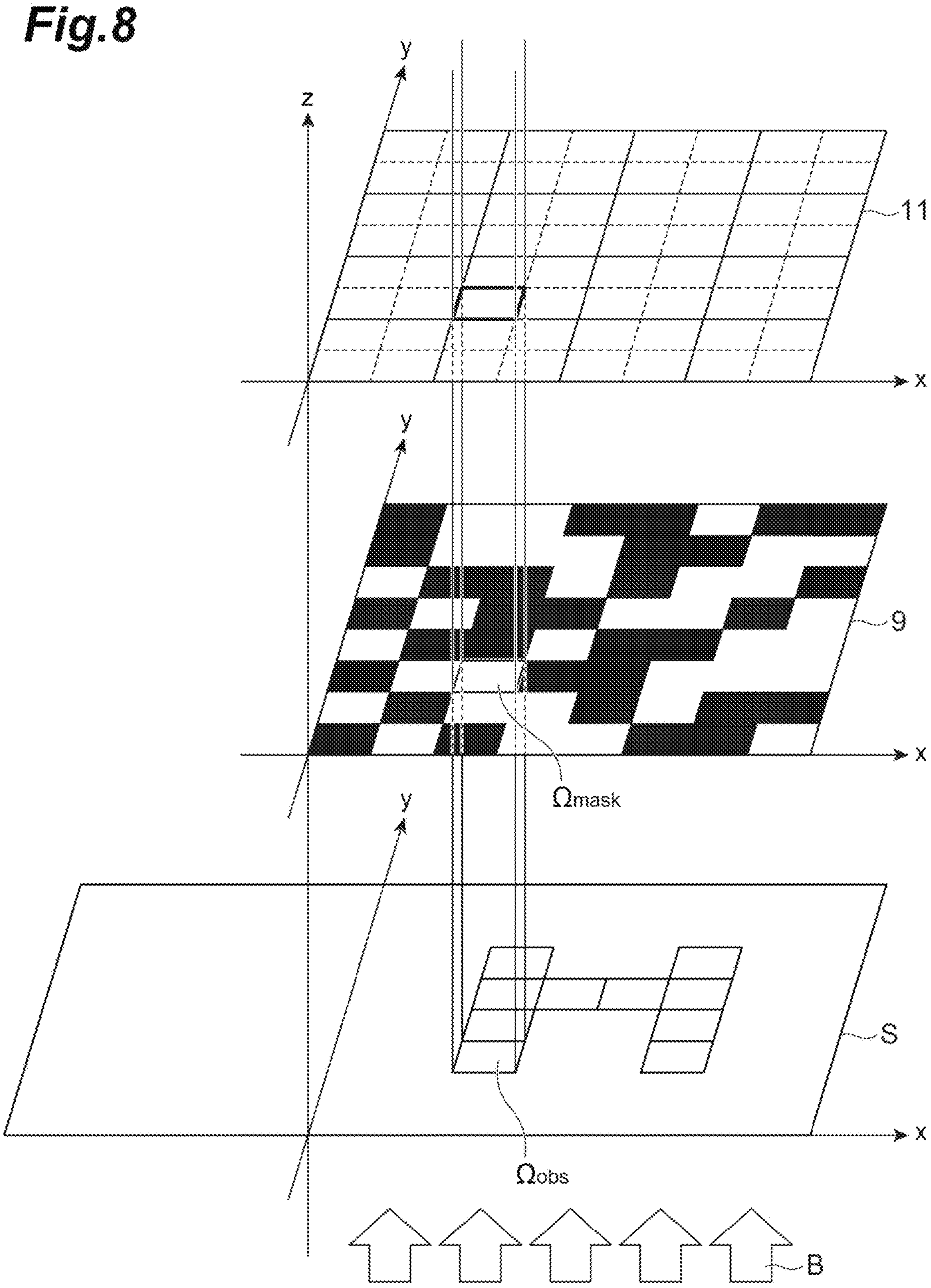
FIG. 8 is a diagram illustrating a relative positional relationship between the subject, the mask member, and the detector at the time of the first measurement.

In FIG. 8, a relative positional relationship between the subject S, the mask member 9, and the detector 11 at the time of the first measurement is illustrated. In a region of the detector 11 (m, n: p, q), light that has passed through a region $\Omega_{obs}$ (m, n: p, q) on the subject S and a region $\Omega_{mask}$ (m, n: p, q) on the mask member 9 enters. A distribution T (x, y) of a transmittance of the mask member 9 on the xy plane is known, and from this distribution, a transmittance T (m, n: p, q) in the region (m, n: p, q) on the mask member 9 is expressed by the following formula (10);

$$T(m,n;p,q)=\frac{1}{|\Omega_{mask}|}\int\int_{\Omega_{mask}}dxdy\,T(x,y). \tag{10}$$

T (m, n; p, q) is an average value of a spatial transmittance of the region of the mask member that transmits the light entering the region (m, n: p, q) of the detector 11. Furthermore, a light intensity $I_{obs,1}$ (m, n: p, q) of light that passes through the region $\Omega_{obs}$ (m, n: p, q) on the subject S at the first measurement is expressed by the following formula (11) using the light intensity distribution $I_{obs}$ (x, y) on the xy plane of the light that passes through the subject S;

$$I_{obs,1}(m,n;p,q)=\frac{1}{|\Omega_{mask}|}\int\int_{\Omega_{mask}}dxdyI_{obs}(x,y). \tag{11}$$

Figure 9:
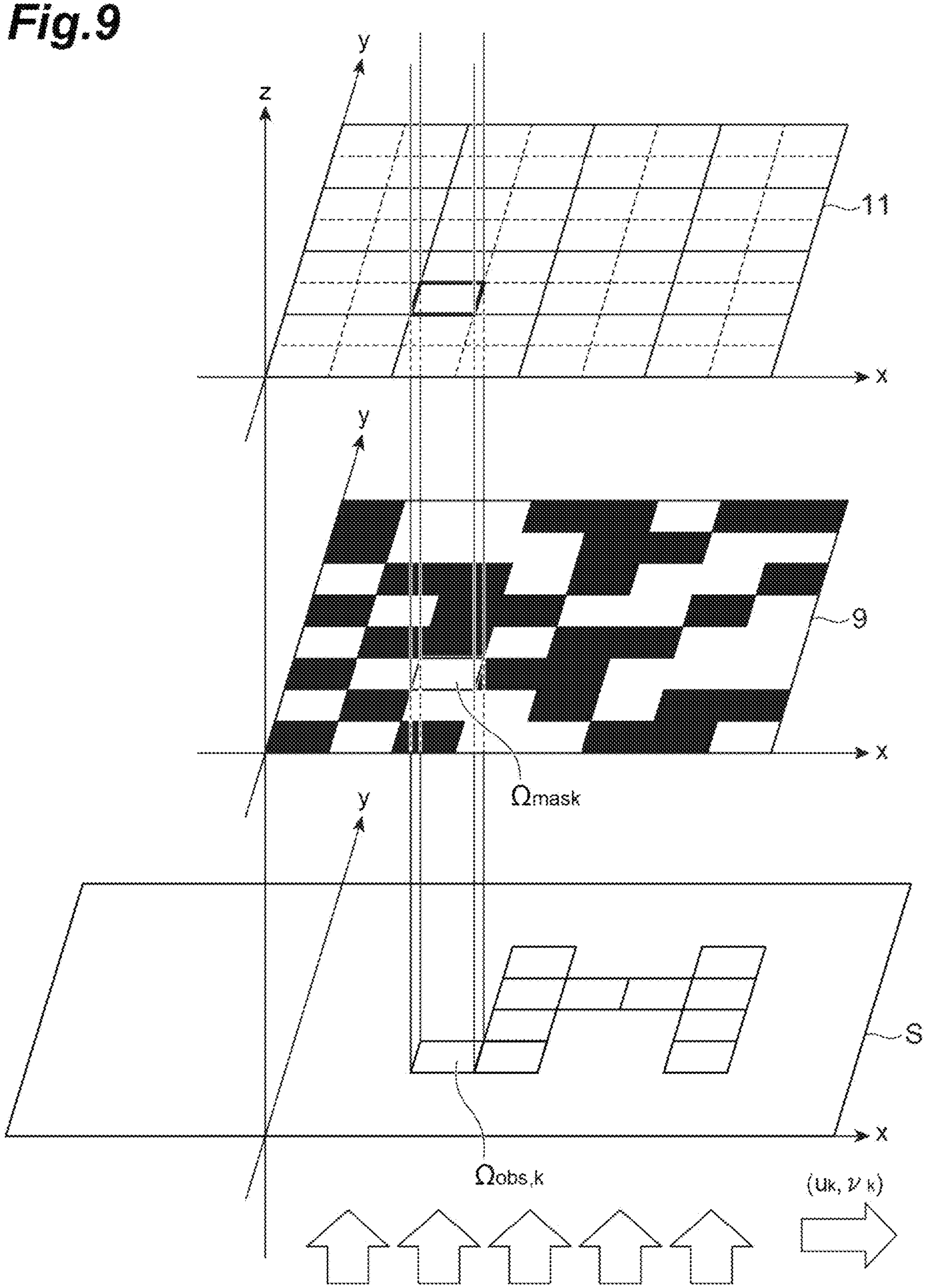
FIG. 9 is a diagram illustrating a relative positional relationship between the subject, the mask member, and the detector at the time of the k-th measurement.

In FIG. 9, a relative positional relationship between the subject S, the mask member 9, and the detector 11 at the time of k-th measurement (k is integer equal to or more than two and equal to or less than K) is illustrated. Based on the data regarding the relative moving amount between the mask member 9 and the subject S, a moving amount $u_k$ of the subject S in the x-axis direction and a moving amount $v_k$ in the y-axis direction at the time of the k-th measurement are specified. The transmittance T (m, n: p, q) in the region (m, n: p, q) of the mask member 9 is represented by the above formula (10). Furthermore, a light intensity $I_{obs,k}$ (m, n: p, q) of light that passes through the region $\Omega_{obs}$ (m, n: p, q) on the subject S at the k-th measurement is expressed by the following formula (12) using the moving amount ($u_k$, $v_k$) and the light intensity distribution $I_{obs}$ (x, y) on the xy plane of the light that passes through the subject S;

$$I_{obs,k}(m,n;p,q)=\frac{1}{|\Omega_{mask}|}\int\int_{\Omega_{mask}}dxdyI_{obs}(x-u_k,y-v_k). \tag{12}$$

A detection signal $O_k$ (m, n) of the pixel 11*b* in the m-th column and the n-th row of the detector 11 at the time of the k-th measurement is expressed by the following formula (13) as a sum of light intensities of light entering a divided region in the pixel;

$$O_k(m,n)=\sum_{\substack{p=1,2,\ldots,P\\ q=1,2,\ldots,Q}}T(m,n;p,q)\times I_{obs,k}(m,n;p,q). \tag{13}$$

When a one-dimensional vector in which the detection signals $O_k$ (m, n) obtained by K times of measurements are arranged in order is assumed as a measurement vector y and a one-dimensional vector in which the light intensities $I_{obs,k}$ (m, n: p, q) are arranged in order for each row as one-dimensional data is assumed as a reconstructed image vector x, each element of the measurement vector y can be expressed as a linear sum of elements of the reconstructed image vector x from the above formula (13). Therefore, the measurement vector y can be expressed by the above formula (6) by using a transformation matrix D.

After obtaining the transformation matrix D as in the first embodiment, using the above theory, the image processing device 7 calculates the reconstructed image vector x using the transformation matrix D and the measurement vector y. Then, the image processing device 7 outputs the two-dimensional reconstructed image to an output device.

According to the image acquisition device 1A according to the second embodiment, it is possible to accurately obtain a high-resolution image of the subject S. In particular, the conveyance mechanism 13A for moving the subject S with respect to the mask member 9 is included. In a case of such a configuration, a size of a detection optical system 5 including the detector 11 can be reduced, regardless of a size of the subject S.

The various embodiments of the present invention have been described above. However, the present invention is not limited to the above embodiments and may be modified or applied to other objects without changing the gist described in each claim.

Figure 10:
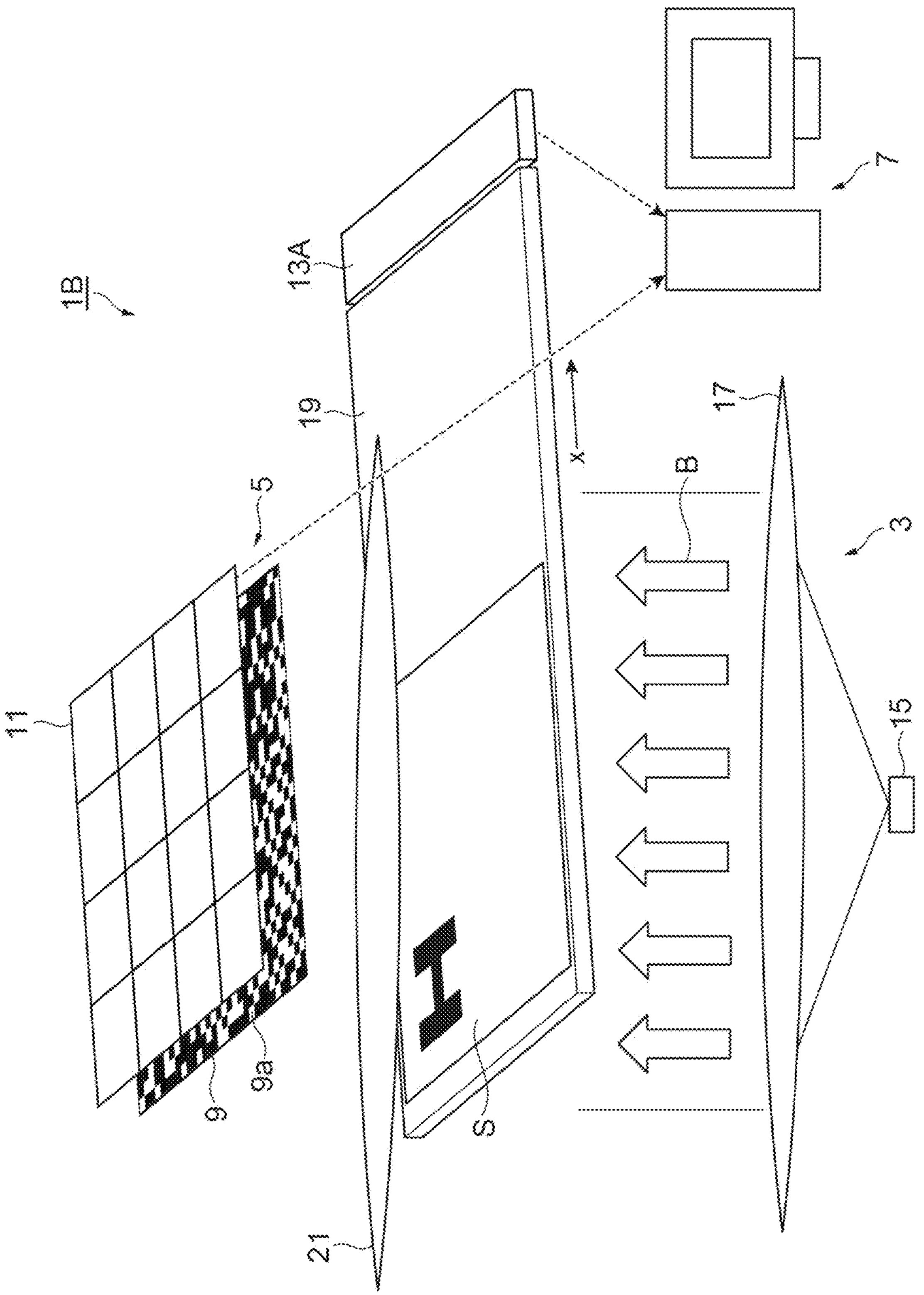
FIG. 10 is a diagram illustrating a configuration of an image acquisition device according to a first modification.

FIG. 10 is a diagram illustrating a configuration of a first modification of the image acquisition device. An image acquisition device 1B according to the first modification illustrated in FIG. 10 is different from the image acquisition device 1A according to the second embodiment in that the image acquisition device 1B includes a lens (lens member) 21 arranged between the belt portion 19 where the subject S is arranged and the mask member 9 and the detector 11. The lens 21 enlarges a parallel wave B that has passed through the subject S, makes the parallel wave B pass through the mask member 9, and forms an image on the detector 11. Here, an interval of the moving amounts at K times of measurements of the conveyance mechanism 13A of the image acquisition device 1B is set to a value considering a magnification ratio of the lens 21 so as to correspond to the size of the mask pixel 9*a* on the mask member 9.

According to such a first modification, it is possible to enlarge the parallel wave B from the subject S and detect the parallel wave B by the detector 11, and it is possible to enlarge and obtain the high-resolution image of the subject S. Furthermore, it is possible to obtain the high-resolution image of the subject S even in a case where a distance between the detector 11 and the subject S is increased, and a degree of freedom of inspection of the subject S is improved. Note that the lens 21 may be added to the image acquisition device 1 according to the first embodiment.

Figure 11:
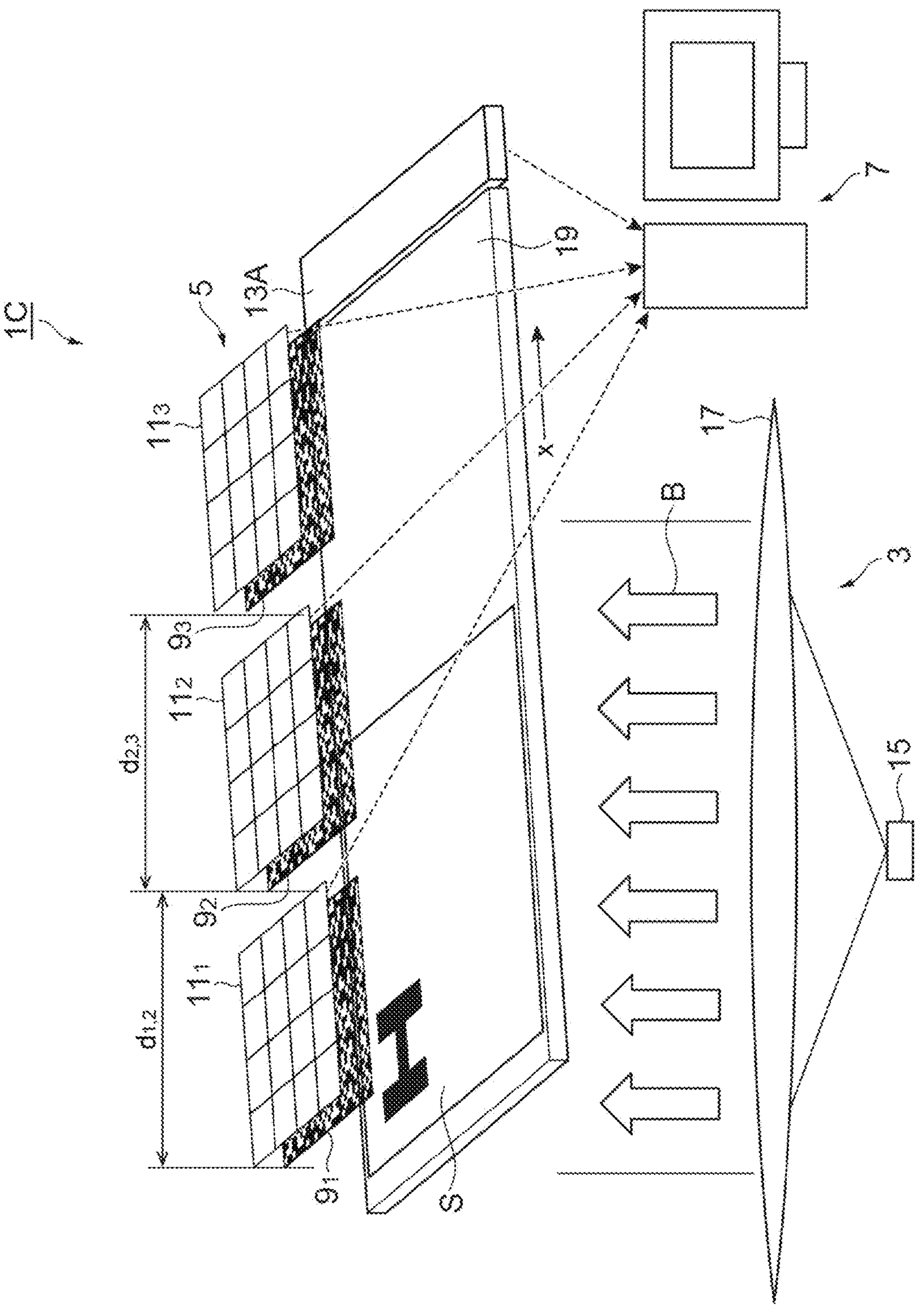
FIG. 11 is a diagram illustrating a configuration of an image acquisition device according to a second modification.

FIG. 11 is a diagram illustrating a configuration of a second modification of the image acquisition device. An image acquisition device 1C according to the second modification illustrated in FIG. 11 is different from the configuration of the image acquisition device 1A according to the second embodiment in that a plurality of combinations of the mask member 9 and the detector 11 is included in the detection optical system 5. That is, the detection optical system 5 includes a mask member $\mathbf{9}_1$ and a detector $\mathbf{11}_1$ arranged to face to each other, a mask member $\mathbf{9}_2$ and a detector $\mathbf{11}_2$ arranged to face to each other, and a mask member $\mathbf{9}_3$ and a detector $\mathbf{11}_3$ arranged to face to each other. The mask member $\mathbf{9}_2$ and the detector $\mathbf{11}_2$ are arranged to be shifted by only a distance $d_{2,3}$ in the x-axis direction with respect to the mask member $\mathbf{9}_3$ and the detector $\mathbf{11}_3$, and the mask member $\mathbf{9}_1$ and the detector $\mathbf{11}_1$ are arranged to be shifted by only a distance $d_{1,2}$ in the x-axis direction with respect to the mask member $\mathbf{9}_2$ and the detector $\mathbf{11}_2$.

A conveyance mechanism 13A of an image acquisition device 1C has a function of linearly moving the subject S in the x-axis direction at a constant speed v. When measurement is started and conveyance of the subject S is started, the detector $\mathbf{11}_3$ repeatedly generates the detection signal O at a timing of a plurality of times $t_3$ when the subject S moves within a range detectable by the detector $\mathbf{11}_3$. On the other hand, the detector $\mathbf{11}_2$ repeatedly generates the detection signal O at a timing of a plurality of times $t_2=t_3-d_{2,3}/v$, and the detector $\mathbf{11}_2$ repeatedly generates the detection signal O at a timing of a plurality of times $t_1=t_2-d_{1,2}/v$.

The image processing device 7 of the image acquisition device 1C generates a reconstructed image, as in the second embodiment, using the detection signals O by the plurality of times of measurement output from the three detectors $\mathbf{11}_1$, $\mathbf{11}_2$, and $\mathbf{11}_3$ and data regarding relative moving amounts between the mask members $\mathbf{9}_1$, $\mathbf{9}_2$, and $\mathbf{9}_3$ and the subject S used at the time of each measurement.

According to the image acquisition device 1C with the above configuration, it is possible to efficiently acquire the plurality of detection signals O in a case where the pattern of the change of the transmittance in the space is changed, and a measurement time can be shortened.

As the detector 11, various types of detectors are used. For example, a bolometer array, a superconducting single photon detector (SSPD) array, an infrared radiation sensor array, a multi-pixel photon counter (MPPC), a photomultiplier tube (PMT) array, a phototube array, an avalanche photodiode (APD) array, a single photon avalanche diode (SPAD), a time of flight (ToF) sensor, a ultraviolet sensor array, a radiation sensor array, an electron/ion sensor array, a stripe detector, a photodiode (PD) array bonding a scintillator, or the like is used.

Furthermore, the electromagnetic wave used to measure the subject S may be a terahertz wave, an infrared ray, an ultraviolet ray, an X-ray, or a gamma ray, in addition to visible light. Furthermore, the electromagnetic wave may be a particle beam of electrons, protons, neutrons, or the like. The mask member 9 used in that case is configured to be able to sufficiently modulate a transmission intensity of the electromagnetic wave or the particle beam of each wavelength. For example, in a case where the X-ray is used, the mask member 9 is formed by forming a hole in a metal plate of lead, iron, or the like having a thickness sufficient to shield the X-ray. In a case where the terahertz wave is used, the mask member 9 is formed by forming a hole in a thin metal film or polychlorinated biphenyl (PCB), for example.

In a case where the particle beam or the electromagnetic wave that can be measured is different from the particle beam or the electromagnetic wave that can be observed, the detector 11 may include a portion that converts the particle beam or the electromagnetic wave. For example, in the first and second embodiments and the first and second modifications, a conversion unit having a finer structure than the pixel 11*b* may be provided in the detector 11, instead of the mask member 9, and the conversion unit may have a function same as the mask member 9. An X-ray scintillator may be provided as the conversion unit, and structures obtained by making a scintillator be finer may be randomly arranged in the detector 11, and a part of the scintillator may be spatially transformed through laser processing. Furthermore, a configuration may be used in which the conversion unit having such a configuration is used in combination with the mask member 9.

A spatial modulation pattern of the mask pixel 9*a* of the mask member 9 may be irregular as a random pattern or the like or may have regularity as a Hadamard matrix.

The image processing device 7 may reconstruct an image by applying sparsity to the entire image of the subject S, or may increase a resolution of only a part of the image by reconstructing the image by applying the sparsity to only a region of interest across a plurality of pixels.

The mask member 9 may have a configuration to be a modulation pattern different for each pixel 11*b*. In this case, between the mask member 9 and the subject S, movement may be performed in subpixel units or in units of one or more pixels. Furthermore, a moving direction may be the x-axis direction, or the y-axis direction, or both directions. Furthermore, the mask member 9 may have a configuration having the same modulation pattern between the pixels 11*b*. In this case, at the time of measurement, movement between the mask member 9 and the subject S may be performed in subpixel units. At this time, the moving direction may be the x-axis direction, or the y-axis direction, or both directions.

The mask member 9 is not limited to have a configuration of which the spatial transmittance changes between two values and may be a configuration of which the spatial transmittance changes between three or more values. In this case, a configuration that has a modulation pattern different for each pixel 11*b* may be used, and a configuration that has a modulation pattern same between the pixels 11*b* may be used.

In the first embodiment described above, a configuration in which the plurality of mask members 9 is arranged to be overlapped may be adopted. The spatial modulation patterns of the plurality of mask members 9 may be the same or different. In this case, the moving mechanism 13 moves one or more mask members 9 among the plurality of mask members 9. Furthermore, a configuration combined with the conveyance mechanism 13A that moves the subject S may be used.

The detector 11 is not limited to have the configuration having the pixels 11*b* two-dimensionally arranged and may be a one-dimensional line sensor having a plurality of pixels that is one-dimensionally arranged. For example, the detector 11 may have a configuration in which the plurality of pixels is arranged along the y-axis direction, a configuration in which the plurality of pixels is arranged along the x-axis direction (moving direction of mask member 9 or subject S), or a configuration in which the plurality of pixels is arranged along a direction inclined with respect to the x-axis direction and the y-axis direction.

In the embodiments described above, it is preferable for the processor to reconstruct an image based on the plurality of the detection signals of the plurality of pixels obtained when the relative moving amount changes. In this case, the image can be reconstructed based on the plurality of detection signals obtained while changing the pattern of the change in the transmittance in the space, and it is possible to further improve the accuracy of the high-resolution image of the subject.

Furthermore, in the embodiments described above, it is preferable to further include the moving mechanism that moves the mask member with respect to the subject and outputs the data regarding the moving amount to the processor. In this case, it is possible to accurately obtain the high-resolution image of the subject with a compact device configuration.

Furthermore, in the above embodiments, it is preferable to further include the conveyance mechanism that moves the subject with respect to the mask member. In this case, a size of the optical system including the detector can be reduced, regardless of the size of the subject.

Furthermore, in the embodiments described above, it is preferable to further include a light source that emits electromagnetic waves as a beam, and it is preferable that the size of the pattern of the mask member on the intersecting plane be larger than the wavelength of the electromagnetic wave. With such a configuration, it is possible to accurately obtain the high-resolution image of the subject using the detection signal of the subject obtained by irradiating the electromagnetic wave.

Furthermore, in addition, in the embodiments described above, it is preferable to further include the lens member that is arranged between the subject and the detector and forms a image on the detector using the beam from the subject. In this way, even if the distance between the subject and the detector is long, it is possible to enlarge the beam from the subject and to detect the beam by the detector, and it is possible to accurately obtain the high-resolution image of the subject.

Furthermore, in addition, in the embodiments described above, it is preferable to include the plurality of pairs of the mask members and the detectors. With such a configuration, the plurality of detection signals in a case where the pattern of the change of the transmittance in the space is changed can be efficiently acquired.

Furthermore, in the embodiments described above, it is preferable for the detector to include the plurality of pixels that is two-dimensionally arranged. In this case, it is possible to efficiently obtain a high-resolution image with high accuracy in a wide range.

Moreover, in the embodiments described above, it is preferable for the processor to apply the sparsity only to the region of interest across the plurality of pixels and reconstruct an image. In this case, it is possible to efficiently obtain a high-resolution image with high accuracy within a limited range.

The image acquisition device according to the embodiment is [1] “an image acquisition device including a mask member that has a pattern that changes a transmittance of some beams from a subject on an intersecting plane intersecting with an incident direction of the beam, a detector including a plurality of pixels that is arranged in a direction intersecting with the incident direction of the beam and detects a beam that has passed through the mask member, and a processor that reconstructs an image using compressed sensing based on data regarding a relative moving amount between the mask member and the subject and detection signals of the plurality of pixels input from the detector, in which a size of the pattern of the mask member on the intersecting plane is smaller than a size of the plurality of pixels along the intersecting plane”.

The image acquisition device according to the embodiment may be [2] “the image acquisition device according to [1], in which the processor reconstructs the image based on the plurality of the detection signals of the plurality of pixels obtained when the relative moving amount changes”.

The image acquisition device according to the embodiment may be [3] “the image acquisition device according to [1] or [2], further including a moving mechanism that moves the mask member with respect to the subject and outputs data regarding the moving amount to the processor”.

The image acquisition device according to the embodiment may be [4] “the image acquisition device according to [1] or [2], further including a conveyance mechanism that moves the subject with respect to the mask member”.

The image acquisition device according to the embodiment may be [5] “the image acquisition device according to any one of [1] to [4], further including a light source that emits an electromagnetic wave as the beam, in which the size of the pattern of the mask member on the intersecting plane is larger than a wavelength of the electromagnetic wave”.

The image acquisition device according to the embodiment may be [6] “the image acquisition device according to any one of [1] to [5], further including a lens member that is arranged between the subject and the detector and forms an image of the beam from the subject on the detector”.

The image acquisition device according to the embodiment may be [7] “the image acquisition device according to any one of [1] to [6], including a plurality of pairs of the mask members and the detectors”.

The image acquisition device according to the embodiment may be [8] “the image acquisition device according to any one of [1] to [7], in which the detector includes the plurality of pixels that is two-dimensionally arranged”.

The image acquisition device according to the embodiment may be [9] “the image acquisition device according to any one of [1] to [8], in which the processor applies sparsity only to a region of interest across a plurality of pixels and reconstructs an image”.

REFERENCE SIGNS LIST

1, 1A, 1B, 1C image acquisition device
7 image processing device (processor)
9, $\mathbf{9}_1$, $\mathbf{9}_2$, $\mathbf{9}_3$ mask member
9*a* mask pixel (pattern)
11, $\mathbf{11}_1$, $\mathbf{11}_2$, $\mathbf{11}_3$ detector
11*b* pixel
13 moving mechanism
13A conveyance mechanism
15 light source device (light source)

S subject
O, $O_1$ to $O_K$ detection signal
$u_k$, $v_k$ moving amount

What is claimed is:

1. An image acquisition device comprising:

a mask member configured to have a modulation pattern formed by arranging a plurality of first mask pixels having a first transmittance and a plurality of second mask pixels having a second transmittance different from the first transmittance in a predetermined arrangement, the modulation pattern changing a transmittance of some beams from a subject on an intersecting plane intersecting with an incident direction of the beam;

a detector including a plurality of pixels that is arranged in a direction intersecting with the incident direction of the beam and detects a beam that has passed through the mask member; and a processor configured to reconstruct an image using compressed sensing based on data regarding a relative moving amount between the mask member and the subject and detection signals of the plurality of pixels input from the detector, wherein sizes of the first mask pixel and the second mask pixel on the intersecting plane are smaller than a size of the pixel of the detector along the intersecting plane, and a size of the modulation pattern on the intersecting plane is larger than the size of the pixel of the detector along the intersecting plane.

2. The image acquisition device according to claim 1, wherein the processor reconstructs the image based on the plurality of the detection signals of the plurality of pixels obtained when the relative moving amount changes.

3. The image acquisition device according to claim 1, further comprising a moving mechanism configured to move the mask member with respect to the subject and output data regarding the moving amount to the processor.

4. The image acquisition device according to claim 1, further comprising a conveyance mechanism configured to move the subject with respect to the mask member.

5. The image acquisition device according to claim 1, further comprising a light source configured to emit an electromagnetic wave as the beam, wherein the size of the pattern of the mask member on the intersecting plane is larger than a wavelength of the electromagnetic wave.

6. The image acquisition device according to claim 1, further comprising a lens member configured to be arranged between the subject and the detector and forms an image of the beam from the subject on the detector.

7. The image acquisition device according to claim 1, further comprising a plurality of pairs of the mask members and the detectors.

8. The image acquisition device according to claim 1, wherein the detector includes the plurality of pixels two-dimensionally arranged.

9. The image acquisition device according to claim 1, wherein the processor applies sparsity only to a region of interest region across a plurality of pixels and reconstructs an image.

10. The image acquisition device according to claim 1, wherein the relative moving amount is set to correspond to a size of the first mask pixels and the second mask pixels.

* * * * *